United States Patent
Kilduff et al.

(10) Patent No.: US 7,086,282 B2
(45) Date of Patent: Aug. 8, 2006

(54) ADJUSTABLE MEASURING SCOOP

(75) Inventors: Edward H. Kilduff, New York, NY (US); William Y. Kang, New York, NY (US)

(73) Assignee: Dalla Piazza & Co., Schneisingen (CH)

( * ) Notice: Subject to any disclaimer, the term of this patent is extended or adjusted under 35 U.S.C. 154(b) by 0 days.

(21) Appl. No.: 11/040,416

(22) Filed: Jan. 21, 2005

(65) Prior Publication Data

US 2005/0160809 A1  Jul. 28, 2005

Related U.S. Application Data

(63) Continuation-in-part of application No. 10/765,294, filed on Jan. 27, 2004.

(51) Int. Cl.
*G01F 19/00* (2006.01)
*A01B 1/02* (2006.01)

(52) U.S. Cl. .......................... 73/429; 73/426; 73/427; 294/55; D10/46.2; D10/78

(58) Field of Classification Search .................. 73/426, 73/429; 220/4.22, 4.23, 6, 7, 8; D10/46.2, D10/78; 116/227, 327; 33/1 V
See application file for complete search history.

(56) References Cited

U.S. PATENT DOCUMENTS

| | | | | |
|---|---|---|---|---|
| 2,313,213 A | * | 3/1943 | Atherley | 222/309 |
| 2,630,014 A | * | 3/1953 | Chester | 73/429 |
| 2,664,753 A | * | 1/1954 | Hein | 73/429 |
| 2,839,928 A | | 6/1958 | Fohrman | 73/429 |
| 2,882,732 A | * | 4/1959 | Cercone | 73/429 |
| 3,416,375 A | * | 12/1968 | Lubman et al. | 73/429 |
| 3,708,915 A | * | 1/1973 | Davey | 49/340 |
| 4,616,867 A | | 10/1986 | O'Hara | 294/55 |
| 4,638,680 A | * | 1/1987 | Albrecht | 74/516 |
| 4,961,521 A | | 10/1990 | Eckman | 222/142.5 |
| 5,182,948 A | | 2/1993 | Robbins et al. | 73/429 |
| 5,325,717 A | | 7/1994 | Robbins et al. | 73/429 |
| 5,448,913 A | | 9/1995 | Robbins et al. | 73/429 |
| 5,460,042 A | | 10/1995 | Tucker | 73/429 |
| D368,864 S | | 4/1996 | Weterrings | D10/46.3 |
| D370,421 S | * | 6/1996 | Tucker | D10/46.3 |
| D371,976 S | | 7/1996 | Tucker | D10/46.3 |
| D374,181 S | | 10/1996 | Weterrings | D10/46.3 |
| D377,615 S | | 1/1997 | Weterrings | D10/46.2 |
| 5,678,450 A | * | 10/1997 | Robbins et al. | 73/429 |
| D388,717 S | | 1/1998 | Wetterings | D10/46.3 |
| D388,718 S | * | 1/1998 | Weterrings | D10/46.3 |
| 6,026,685 A | * | 2/2000 | Weterrings et al. | 73/429 |
| 6,125,699 A | * | 10/2000 | Molenaar | 73/429 |
| D451,829 S | * | 12/2001 | McGuyer | D10/46.3 |

* cited by examiner

FOREIGN PATENT DOCUMENTS

EP          1048252         11/2000

*Primary Examiner*—Hezron Williams
*Assistant Examiner*—Samir M. Shah
(74) *Attorney, Agent, or Firm*—Law Offices of Thomas J. Brindisi

(57) ABSTRACT

An adjustable measuring scoop including a movable partition that adjustably rotates on a rotating means such as an axle so as to result in a scoop size that can be selectively determined between a maximum and a minimum by ready manual manipulation of the scoop. The movable partition and rotating means are preferably configured so that the movable partition moves toward and away from the scoop's opening, permitting, e.g., a symmetric frontal contour that may be more effective in scooping from a container. Adjustment of the movable partition may also optionally be effected by means including a manual slide that has a linear and/or relatively short range of motion.

20 Claims, 7 Drawing Sheets

FIG. 7
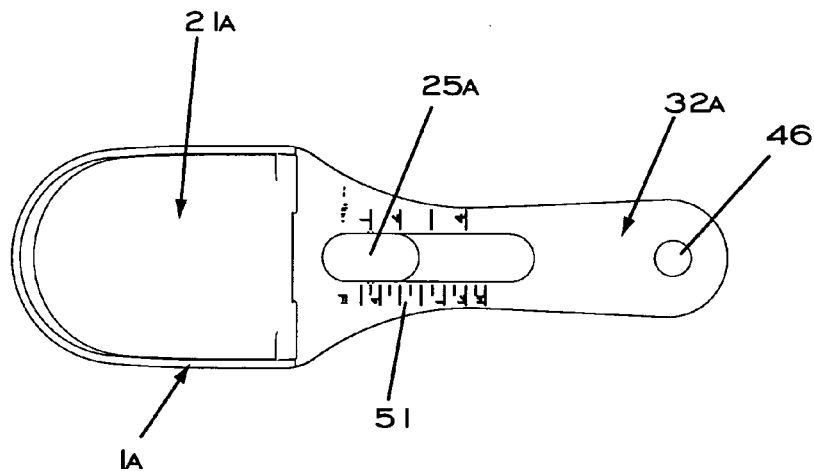
FIG. 8
FIG. 9
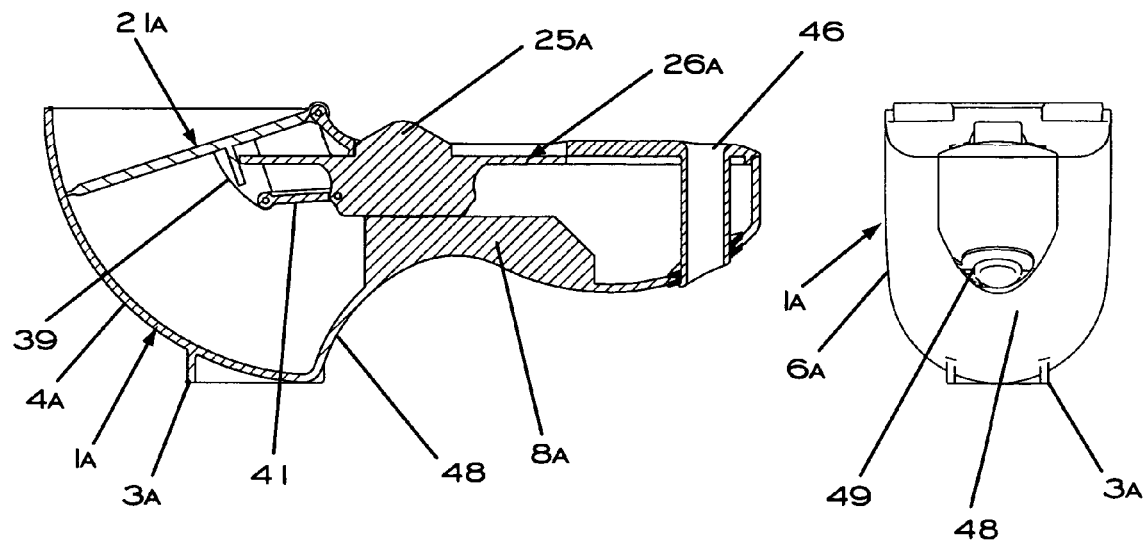

US 7,086,282 B2

ADJUSTABLE MEASURING SCOOP

RELATED APPLICATION

This application is a continuation-in-part of U.S. patent application Ser. No. 10/765,294 entitled "Adjustable Measuring Scoop," and filed on Jan. 27, 2004.

FIELD OF THE INVENTION

The present invention generally relates to the field of measuring devices, and more particularly to a measuring scoop that can be adjusted to measure various specific amounts of materials such as cooking ingredients.

BACKGROUND OF THE INVENTION

Adjustable measuring devices exist, but with one or more drawbacks. U.S. Pat. No. 5,678,450 to Robbins et al. discloses an adjustable measurement container in which the size of the scoop is adjusted by linearly sliding a sliding member that includes a covering portion (unnumbered) and a partition (dam 42). U.S. Pat. No. 6,125,699 to Molenaar discloses an adjustable measuring spoon in which the size of the scoop is adjusted by rotating a pivoting member that also includes a covering portion (gate 23) and a partition (49). Use and/or cleaning of the Robbins (e.g., col. 3, lines 28–31 and col. 4, lines 47–50) and Molenaar (e.g., col. 3, lines 40–45 and col. 4, lines 27–29) devices is made less convenient by their inclusion of the covering portions, which are evidently needed to inhibit spillage of material being scooped into the region of the spoon or scoop that is unused when a size other than maximum is selected. Additionally, adjustment of both devices requires a relatively long manual motion to move from the minimum to maximum positions. Further, the front of the Molenaar measuring spoon is not symmetric since the pivoting member follows a curved path that is orthogonal to the general intended direction of scooping.

SUMMARY OF THE INVENTION

The present invention is directed to an adjustable measuring scoop that may address one or more of the foregoing and/or other prior art shortcomings. An adjustable measuring scoop according to the present invention includes a movable partition that adjustably rotates on a rotating means such as an axle so as to result in a scoop size that can be selectively determined between a maximum and a minimum by ready manual manipulation of the scoop by a user. In one aspect of the invention, the movable partition and rotating means are preferably configured so that the movable partition moves toward and away from the scoop's opening, permitting, inter alia, a symmetric frontal contour that may be more effective in scooping an ingredient, for example, from the bottom region of a container. In another optional separate aspect of the invention, adjustment of the movable partition is effected by operation of means including a manual slide that has a range of motion that is linear rather than arcuate, so as to permit more convenient manual adjustment. In yet another separate optional aspect of the invention, adjustment of the movable partition is effected by operation of means including a lever having a range of motion that is short relative to the resulting movement of the movable partition, so as to permit more convenient manual adjustment. In still another separate optional aspect of the invention, the movable partition may be effectively implemented without the need for an accompanying covering portion, permitting a design in which scooping with and/or cleaning of the device may be cleaner and/or easier.

BRIEF DESCRIPTION OF THE DRAWINGS

FIGS. 1–6 are views of a first embodiment of an adjustable measuring scoop of an embodiment of the invention, wherein:
 FIG. 1 is an exploded top perspective view;
 FIG. 2 is an exploded bottom perspective view;
 FIGS. 3 and 4 are top and bottom perspective views, respectively, showing the movable partition in a first open position; and,
 FIGS. 5 and 6 are top and bottom perspective views, respectively, showing the movable partition in a second open position.
FIGS. 7–11 are views of a second embodiment of an adjustable measuring scoop of an embodiment of the invention, wherein:
 FIG. 7 is a top view;
 FIG. 8 is a side sectional view;
 FIG. 9 is a rear view;
 FIG. 10 is an exploded top perspective view; and,
 FIG. 11 is an exploded side sectional view.

DETAILED DESCRIPTION OF A PREFERRED EMBODIMENT

Figure 1:
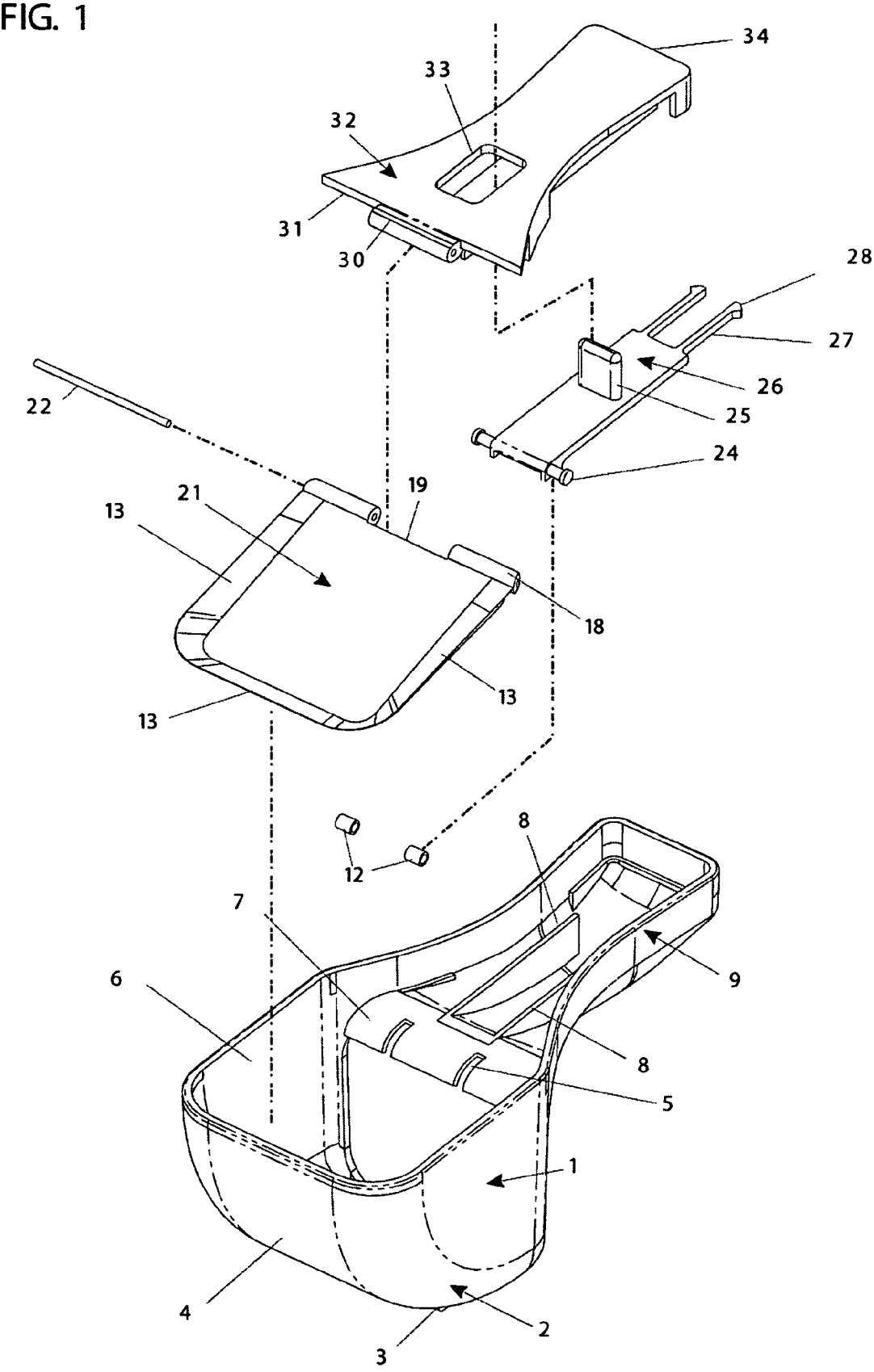
Figure 2:
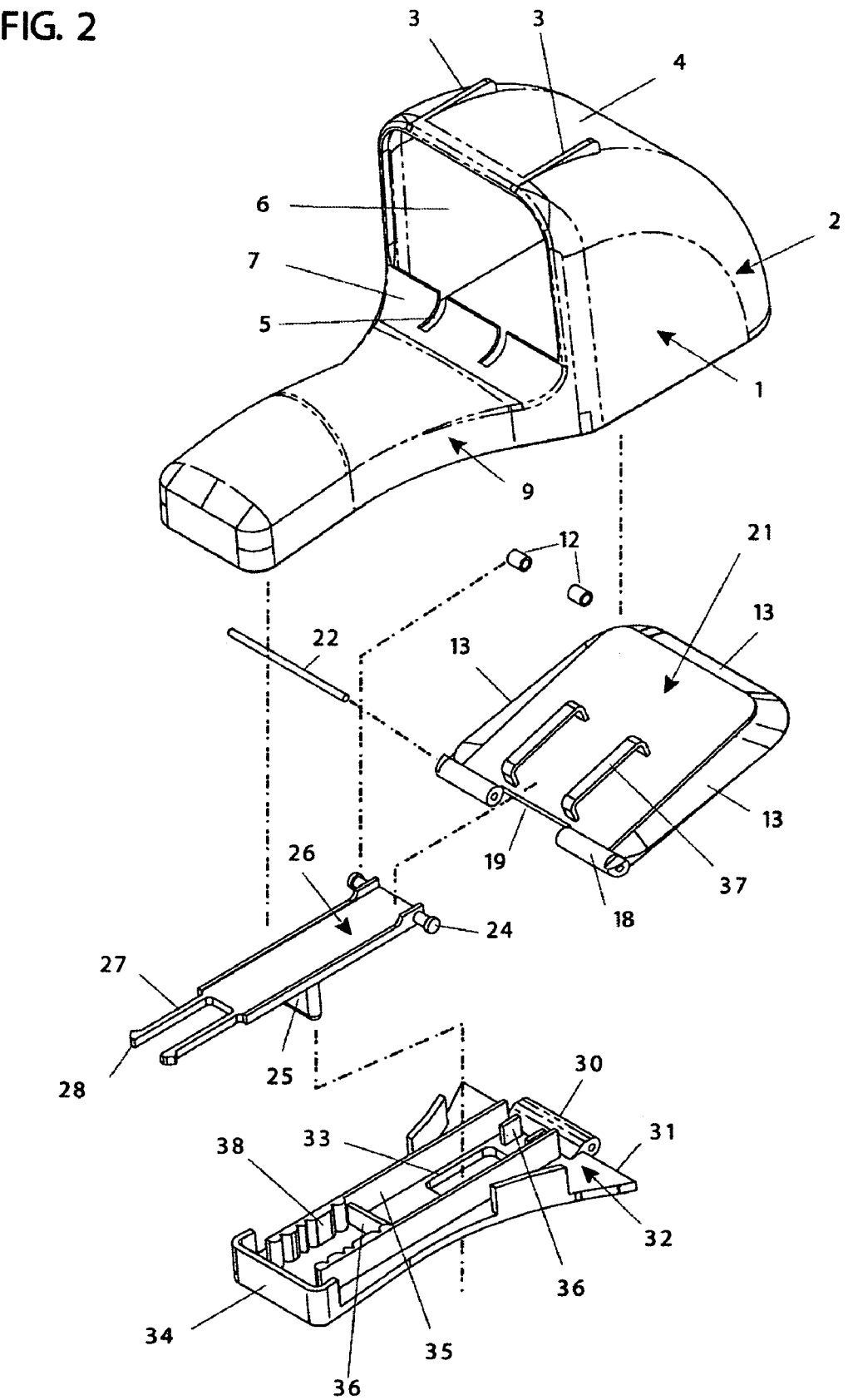
Figure 3:
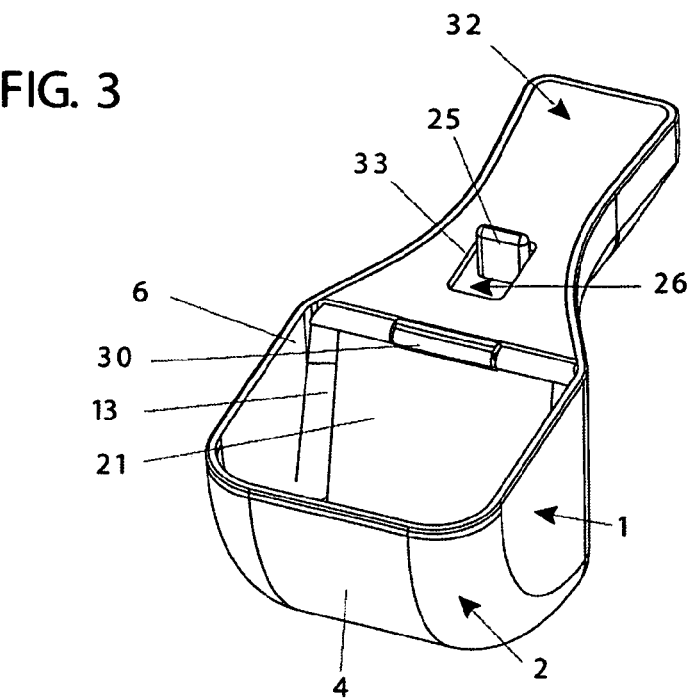
Figure 4:
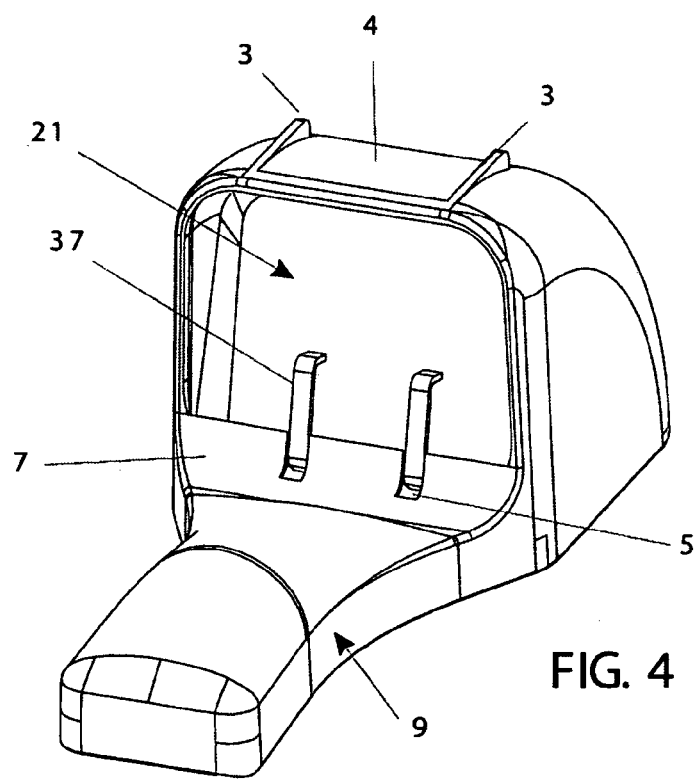
Figure 5:
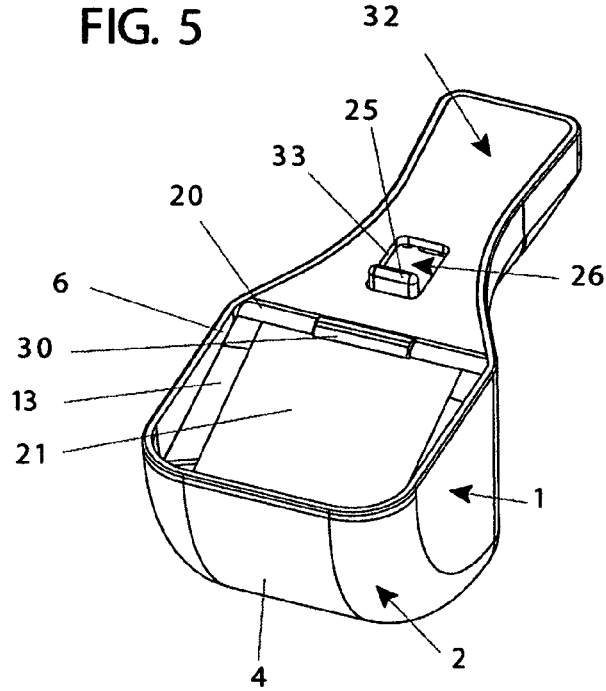
Figure 6:
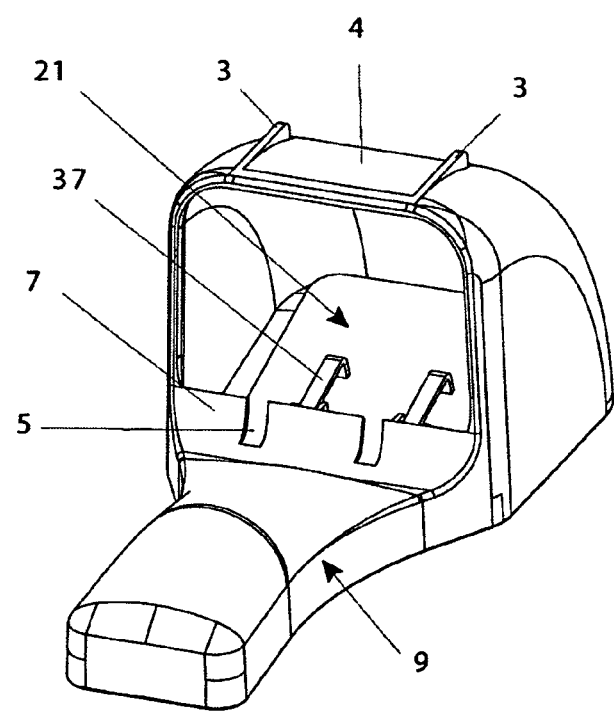

A first preferred embodiment of an adjustable measuring scoop according to the invention is shown in FIGS. 1–6. Scoop 1 is a utensil preferably used for measurement of quantities of materials such as cooking ingredients or any other suitable items. The capacity of scoop 1 is adjustable to allow measurement of a range of quantities of materials. Scoop 1 is preferably made predominantly of molded plastic although other materials such as metal or aluminum can be used.

Scoop 1 generally comprises a bucket 2, an ergonomically shaped handle 9, and a movable partition 21. The walls of the bucket 2 comprise a front/bottom portion 4 and side portions 6, with pedestals 3 provided at the bottom of front/bottom portion 4 to permit the scoop to be rested on a suitable flat surface. The handle 9 also includes a finger rest 7 provided with two guide slots 5, and the movable partition 21 includes a lip 13 along its perimeter that snugly contacts the interior of the walls of bucket 2.

The movable partition 21 is rotatably connected to a handle insert 32 on an axle 22 (preferably made of a suitable metal) within partition axle boxes 18 (which rest on abutments 31 of handle insert 32) and a body axle box 30 (which fits within the space 19 between the partition axle boxes). The handle insert 32 also includes mating extensions 34 to snugly secure it within the handle 9 of the scoop's body; the handle insert 32 is preferably also glued or otherwise permanently secured in place during assembly. A slide 26 is linearly slidingly secured between handle insert 32 and the body of the handle 9 of scoop 1, and is restricted to a linear path by the following elements: on its top, by top supports 36 formed in the handle insert 32; on its bottom by bottom supports 8; and, laterally, by side supports 35 within which the slide 26 is laterally confined.

The slide 26 slides in response to a force applied forward or backward by a user's finger (preferably thumb) on the portion of trigger 25 protruding through aperture 33. Forward movement of the slide 26 forces the slide "T" 24 against the rear of the movable partition 21, causing the partition 21 to swing upwardly toward the opening of the bucket 2 of the scoop 1. Conversely, backward movement of the slide 26 pulls the slide "T" 24 against guides 37, causing the partition 21 to swing downwardly away from the opening of the bucket 2. These movements are also facilitated by bushings 12 fitted on the ends of the slide "T" 24 (which may include a metal component for durability) and run within the guides 37. To facilitate temporary securing of a desired position for the movable partition 21 within the bucket 2, the slide 26 is provided with locking extensions 27 having ribs 28 that mate with corresponding locking grooves 38 formed into the handle insert 32. The locking grooves 38 preferably include a number of positions associated with specific corresponding adjusted sizes of bucket 2, and are dimensioned and configured together with the locking extensions 27 and ribs 28 to permit ribs 28 to engage any of the locking grooves 38 securely enough to permit handling and transportation of the scoop 1 (without inadvertent movement of the movable partition 21) while a load of material is in bucket 2 without the need for constant manual securing of any parts, while still permitting the ribs 28 to pass between the locking grooves 38 upon application of a reasonable manual force on the trigger 25. As will be readily apparent to one of ordinary skill in the art, the handle insert 32 may also have reference indicia (not shown) aligned with the trigger 25 in conjunction with which the selected size of the bucket 2 is visually indicated to the user. The bucket 2 may also have reference indicia (not shown).

As shown in the sequence of FIGS. 3–4 and 5–6, manual adjustment of the trigger 25 back and forth causes the movable partition 21 to rotate back and forth on axle 22, with its lip 13 snugly sliding along the complementary interior surface of the fixed walls of the bucket 2. The curvature of the walls' front/bottom portion 4 is substantially defined by a portion of a cylinder of rotation about the axle 22, such that the partition 21 can swing along the interior of the bucket 2 with a snug sliding fit that prevents material being measured from moving past the partition 21 and entering the unused space on the side of the partition 21 opposite the opening of the bucket 2. To facilitate a reliable snug sliding fit, the scoop 1 is preferably made of a durable and high strength plastic that will not deform under normal operating temperatures and conditions, such as injection molded polycarbonate or ABS plastic. Alternately, it could be formed substantially of stainless steel, or chrome-plated die-cast zinc.

Figure 10:
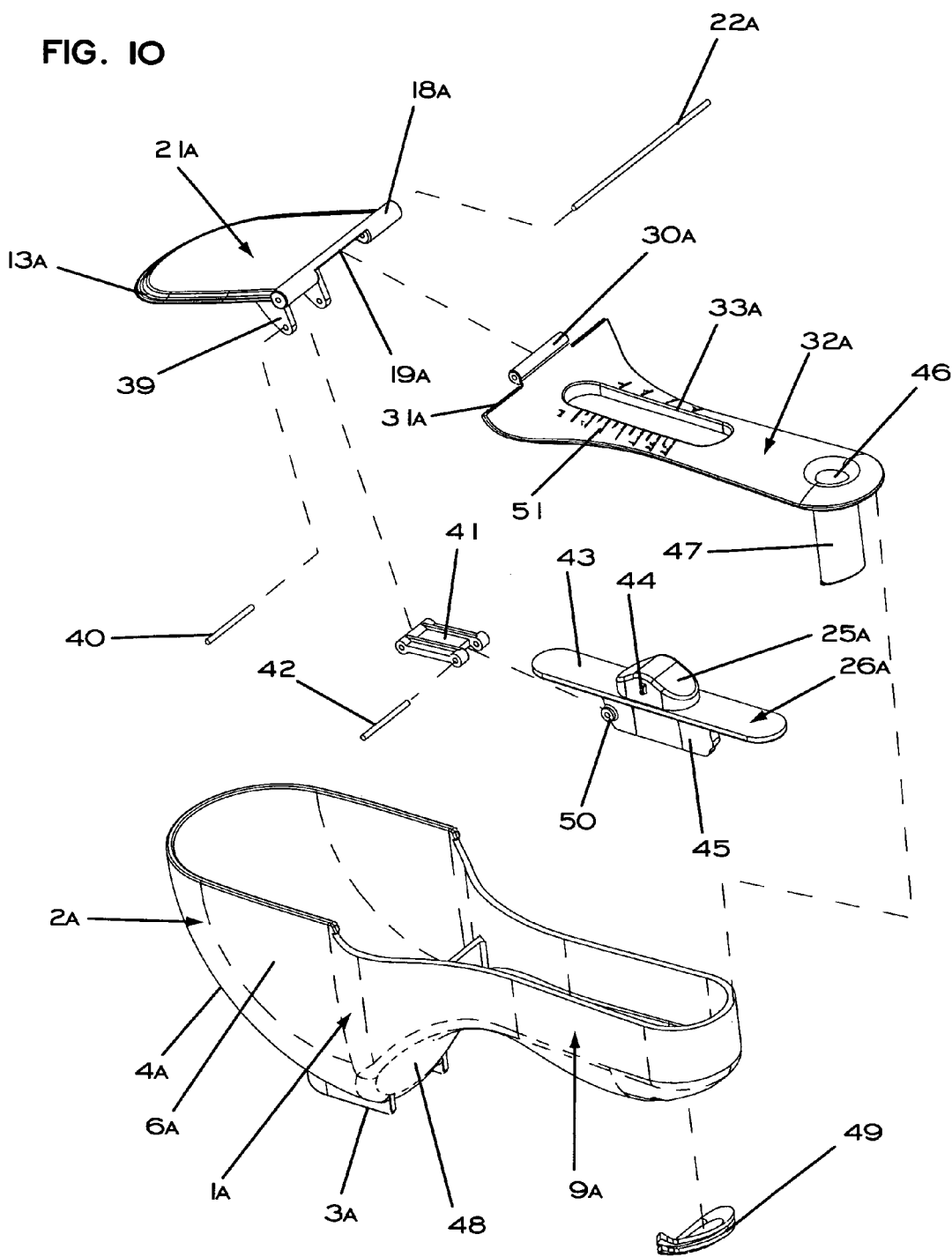
Figure 11:
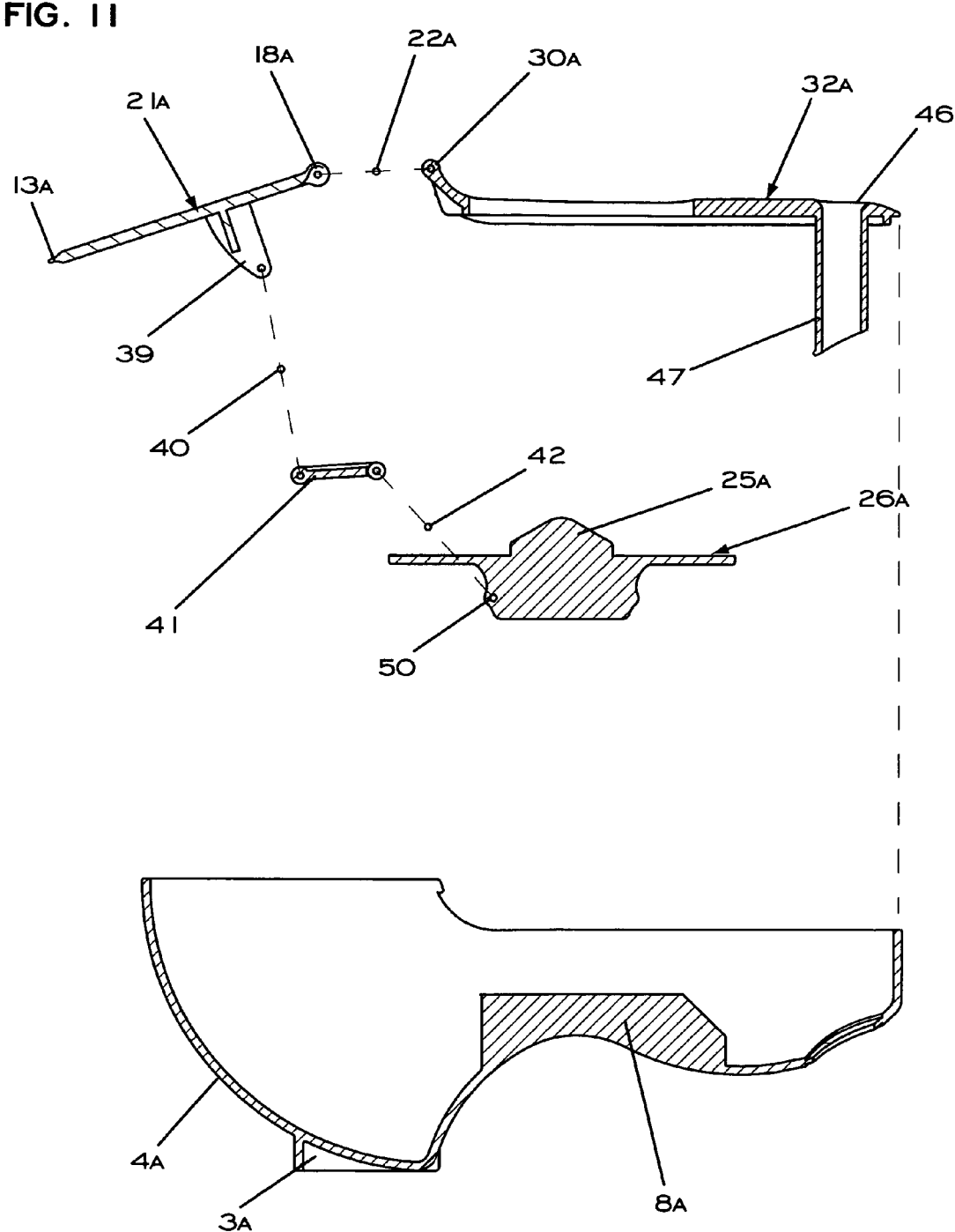

A second preferred embodiment of an adjustable measuring scoop according to the invention is shown in FIGS. 7–11. Scoop 1A is likewise a utensil preferably used for measurement of quantities of materials such as cooking ingredients or any other suitable items. Its capacity is adjustable to allow measurement of a range of quantities of materials, and it is preferably made predominantly of molded plastic. Scoop 1A generally comprises a bucket 2A, an ergonomically shaped handle 9A, and a movable partition 21A. The walls of the bucket 2A comprise a front/bottom portion 4A and side portions 6A, with pedestals 3A provided at the bottom of front/bottom portion 4A to permit the scoop to be rested on a suitable flat surface. The handle 9A also includes a back wall 48, and the movable partition 21A with a lip 13A along its perimeter that snugly and relatively hermetically contacts the interior of the walls of bucket 2A. The handle 9A may also include a cylindrical insert 47 with a passage 46 defined through it (such as for the attachment of a lanyard) and one or more fittings such as a metallic bezel 49.

The movable partition 21A is rotatably connected to a handle insert 32A on an axle 22A (preferably made of a suitable metal) within partition axle boxes 18A (which rest on abutments 31A of handle insert 32A) and a body axle box 30A (which fits within the space 19A between the partition axle boxes). A slide 26A is linearly slidingly secured between handle insert 32A and the body of the handle 9A, and is restricted to a linear path therein similar to the description above of the embodiment of FIGS. 1–6, including by bottom supports 8A within which the runner 45 of slide 26A is laterally confined. The handle insert 32A is preferably also glued or otherwise permanently secured in place during assembly, and may include printed and/or embossed metric and/or imperial measuring markings 51. The trigger 25A of slide 26A may also include one or more (e.g., raised and pointed) measuring indicators 44 so that a user can readily reference the pertinent position on the markings 51. The bucket 2A may also have reference indicia (not shown).

As in the embodiment of FIGS. 1–6, the slide 26A slides in response to a force applied forward or backward by a user's finger (preferably thumb) on the portion of trigger 25A protruding through aperture 33A. Forward movement of the slide 26A (which includes axle box 50) moves forward the connector rear axle 42, which in turn moves forward connector 41 to which it is attached, which in turn moves forward connector forward axle 40 (which is attached to the connector 41 and to extensions 39 of partition 21A), which in turn moves forward the extensions 39 of partition 21A, causing partition 21A to pivot forward on axle 22A and swing upwardly toward the opening of the bucket 2A. Backward movement of the slide 26A causes the reverse of these movements. These movements may optionally be facilitated by fitting bushings where one or more axles (e.g., 40 and 42) make moving contact. Also, the parts may be configured and dimensioned so that the forward tab 43 of slide 26A contacts the rear of partition 21A throughout some portion of the partition's range of motion so as to provide an additional point of support for the partition throughout that portion of range of motion. To facilitate a reliable snug and relatively hermetic sliding fit between the lip 13A of the movable partition 21A and the complementary interior surface of the fixed walls of the bucket 2A as the partition rotates back and forth on axle 22A, the scoop is preferably predominantly formed of a durable and high-strength material that (except for the material for lip 13A) will not deform under normal operating temperatures and conditions. The lip 13A is preferably formed of a relatively pliable but durable rubber material, and the parts may also preferably be configured and chosen of materials such that the fit between lip 13A and bucket 2A is at least snug enough to prevent unintended movement of partition 21A in response to nominally small forces on trigger 25A and/or directly on partition 21A. The materials and configuration may in fact be selected so as to provide adequate snugness and hermeticity for the containment of liquids.

Preferred embodiments of an adjustable measuring scoop have thus been disclosed. It will be apparent, however, that various changes may be made in the form, construction, and arrangement of the parts without departing from the spirit and scope of the invention, the form hereinbefore described being merely a preferred or exemplary embodiment thereof. Therefore, the invention is not to be restricted or limited except in accordance with the following claims.

What is claimed is:

1. An adjustable measuring scoop comprising:

a) a bucket including at least one fixed wall and an opening;

b) a movable partition providing another wall for said bucket, said movable partition connected to said scoop by a rotating means and having a range of motion, and said movable partition including a predominant portion and a lip extending around said predominant portion, wherein said lip is more pliable than said predominant portion and wherein said lip extends substantially outwardly away from said predominant portion and;

c) a handle connected to said bucket; and, d) adjustment means for manually moving said movable partition on said rotating means so as to permit convenient selection of a desired scoop size within a maximum and a minimum size, by ready manual manipulation of said adjustment means.

2. The adjustable measuring scoop of claim 1, wherein said rotating means is positioned such that said movable partition is movable toward and away from said opening of said bucket.

3. The adjustable measuring scoop of claim 2, wherein said bucket includes a front portion, and said front portion has left and right aspects that are substantially symmetric to one another.

4. The adjustable measuring scoop of claim 2, wherein said rotating means includes an axle and one or more axle boxes.

5. The adjustable measuring scoop of claim 2, further comprising means for temporarily securing the position of said movable partition once a desired scoop size has been selected.

6. The adjustable measuring scoop of claim 5, wherein said means for temporarily securing includes grooves and ribs.

7. The adjustable measuring scoop of claim 2, wherein said adjustment means includes a manual slide that acts as a lever on said movable partition so as to permit a range of motion along at least part of said movable partition that exceeds the corresponding range of motion of said slide.

8. The adjustable measuring scoop of claim 7, wherein said adjustment means further includes one or more supports restricting said range of motion of said manual slide to a linear path.

9. The adjustable measuring scoop of claim 1, wherein said adjustment means includes a manual slide and one or more supports restricting said range of motion of said manual slide to a linear path.

10. The adjustable measuring scoop of claim 9, wherein said manual slide acts as a lever on said movable partition so as to permit a range of motion along at least part of said movable partition that exceeds the corresponding range of motion of said slide.

11. The adjustable measuring scoop of claim 9, wherein said manual slide is at least partly located in said handle and includes a trigger, and said handle includes a trigger aperture.

12. The adjustable measuring scoop of claim 9, further comprising means for temporarily securing the position of said movable partition once a desired scoop size has been selected.

13. The adjustable measuring scoop of claim 9, wherein said rotating means includes an axle and one or more axle boxes.

14. The adjustable measuring scoop of claim 9, wherein said rotating means is positioned such that said movable partition is movable toward and away from said opening of said bucket.

15. The adjustable measuring scoop of claim 1, wherein said lip is configured to make contact with said fixed wall at said bucket with adequate snugness and hermeticity so as to permit for the containment of liquids.

16. The adjustable measuring scoop of claim 15, wherein said lip has a pointed outer perimeter.

17. The adjustable measuring scoop of claim 15, wherein said adjustment means includes a manual slide and one or more supports restricting said range of motion of said manual slide to a linear path.

18. The adjustable measuring scoop of claim 17, wherein said rotating means is positioned such that said movable partition is movable toward and away from said opening of said bucket.

19. The adjustable measuring scoop of claim 17, wherein said manual slide acts as a lever on said movable partition so as to permit a range of motion along at least part of said movable partition that exceeds the corresponding range of motion of said slide.

20. The adjustable measuring scoop of claim 15, further comprising means for temporarily securing the position of said movable partition once a desired scoop size has been selected.

* * * * *